United States Patent
Xue et al.

(12) 
(10) Patent No.: US 6,334,026 B1
(45) Date of Patent: Dec. 25, 2001

(54) ON-SCREEN DISPLAY FORMAT REDUCES MEMORY BANDWIDTH FOR TIME-CONSTRAINED ON-SCREEN DISPLAY SYSTEMS

(75) Inventors: Ning Xue, Fremont, CA (US); Takumi Nagasako; Manabu Gouzu, both of Tokyo (JP)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/105,668

(22) Filed: Jun. 26, 1998

(51) Int. Cl.$^7$ .............................. H04N 5/928; H04N 5/91
(52) U.S. Cl. ............................... 386/98; 386/111; 386/71; 369/59.27; 360/48; 375/363
(58) Field of Search ................................. 386/109, 46, 52, 386/96, 98, 111, 112, 71, 12; 375/368–370, 365–366, 363, 364; 370/392; 704/503, 500, 502; 348/423.1; 360/32, 48; 369/59.27, 59.1; H04N 5/928, 5/91

(56) References Cited

U.S. PATENT DOCUMENTS

| | | | |
|---|---|---|---|
| 5,229,862 | * 7/1993 | Takahashi et al. | 386/109 |
| 5,451,942 | * 9/1995 | Beard et al. | 341/50 |
| 5,469,272 | * 11/1995 | Kubota et al. | 386/75 |
| 5,594,660 | * 1/1997 | Sung et al. | 345/302 |
| 5,809,245 | 9/1998 | Zenda . | |
| 5,889,515 | 3/1999 | McDade et al. . | |
| 6,119,092 | * 9/2000 | Patwardhan et al. | 704/503 |
| 6,222,983 | * 4/2001 | Heo | 386/96 |
| 6,226,291 | * 5/2001 | Chauvel et al. | 370/392 |
| 6,272,153 | * 8/2001 | Huang et al. | 370/503 |

* cited by examiner

Primary Examiner—Vincent F Boccio (57) ABSTRACT

A multimedia decoder is provided that inserts synchronization words into elementary linear pulse-code modulation (LPCM) audio bitstreams. In one embodiment, the multimedia decoder includes a pre-parser, a memory, and an audio decoder module. The pre-parser receives a multimedia bitstream and separates it into an audio substream and a video substream, and inserts a synchronization words before each data packet in the audio substream while forming it into an elementary bitstream. The memory is coupled to the pre-parser to buffer the elementary audio bitstream, and the audio decoder module is coupled to the memory to retrieve the elementary audio bitstream and convert it into a digital audio signal. The inserted synchronization word may comprise between from four to ten bytes in length. In one particular implementation, the inserted synchronization word includes the ASCII representation of the letters LSI-LOGIC. The insertion and subsequent detection of a synchronization word in the elementary audio bitstream advantageously provides for robust synchronization in the presence of bitstream corruption while maintaining multimedia decoder modularity.

16 Claims, 7 Drawing Sheets

ON-SCREEN DISPLAY FORMAT REDUCES MEMORY BANDWIDTH FOR TIME-CONSTRAINED ON-SCREEN DISPLAY SYSTEMS

BACKGROUND OF THE INVENTION

1. Field of the Invention

This invention relates to the field of multimedia compression, and in particular to a multimedia decoder having synchronization words included in a linear PCM elementary bitstream.

2. Description of the Related Art

Digital audio and video programs in initial sampled form and final playback form comprise an enormous amount of data, indeed so much that it would be prohibitively expensive to store or to secure the necessary bandwidth and power to transmit programs of moderate quality and length. To address this problem, compression techniques are commonly employed to reduce the amount of data by which the program is represented during storage and transmission, after which the program is reconstructed by some matched decompression method. To ensure compliance between transmitters and receivers of various manufacturers, several compression standards have been established. For audio compression, MUSICAM and Dolby AC-3 are popular. For multimedia (audio/video) compression, MPEG and DVD are popular.

These standards are not completely distinct and independent, e.g. DVD employs MPEG video compression techniques and allows for use of MUSICAM and AC-3 audio compression techniques. Although attention herein is directed primarily to the DVD standard, much of what is said is also applicable to systems operating according to other compression standards, and exclusion of such systems is not intended.

A compressed bitstream created in accordance with the DVD standard consists of interleaved substreams. Examples of substreams which may be included in a DVD bitstream include audio substreams, a video substream, sub-picture unit (SPU) substreams, and navigation substreams. Each substream consists of data packets having a packet header and a packet payload. The packet header includes identifying information specifying which substream the packet belongs to and where it belongs in that substream. The packet header also includes information specifying the payload type and size, and any compression parameters which may be required for decompression.

To reconstruct the original data from the DVD bitstream, a DVD decoder locates the beginning of a packet, then reads the packet header to determine the substream membership. The decoder then routes the packet payload and portions of the packet header to the appropriate elementary bitstream buffer. Various modules of the decoder then operate on the contents of each buffer to reconstruct the associated program component (i.e. audio, video, SPU, navigation), and the reconstructed program component is finally presented to an appropriate output channel for delivery to the user.

As used herein, "substream" refers to the stream of data packets associated with a program component, and elementary bitstream refers to the data which is written to the elementary bitstream buffers, i.e. the contents of the data packet minus the identifying header fields, but including header fields which specify decompression parameters that may be needed by the ensuing decoder modules.

Synchronization of the decoder modules to their respective bitstreams is required for proper decoding, e.g. the decoder modules must be able to distinguish decoding parameters from data. When data packets become corrupted, the potential exists for all subsequent data to become undecodable due to loss of synchronization. It is desirable to provide a decoder with a means for synchronizing all program components whereby synchronization may be maintained in the presence of substream corruption.

SUMMARY OF THE INVENTION

Accordingly, there is provided herein a multimedia decoder that inserts synchronization words into elementary linear pulse-code modulation (LPCM) audio bitstreams. In one embodiment, the multimedia decoder includes a pre-parser, a memory, and an audio decoder module. The pre-parser receives a multimedia bitstream and separates it into an audio substream and a video substream, and inserts a synchronization words before each data packet in the audio substream while forming it into an elementary bitstream. The memory is coupled to the pre-parser to buffer the elementary audio bitstream, and the audio decoder module is coupled to the memory to retrieve the elementary audio bitstream and convert it into a digital audio signal. The inserted synchronization word may comprise between from four to ten bytes in length. In one particular implementation, the inserted synchronization word includes the ASCII representation of the letters LSILOGIC.

There is further provided herein a method for decoding a multimedia bitstream. The method includes: (i) locating a first byte of a data packet; (ii) identifying a substream membership of the data packet; (iii) removing substream membership information fields from the data packet; (iv) inserting a synchronization word in place of the substream membership information if the data packet is a linear PCM audio data packet; (v) storing the data packet in an elementary bitstream buffer; (vi) detecting the inserted synchronization word if the data packet is a linear PCM audio data packet; and (vii) converting the data packet into a digital output signal. The method may further include searching for the inserted synchronization word if the inserted synchronization word is not detected and the data packet is a linear PCM audio data packet.

The insertion and subsequent detection of a synchronization word in the elementary audio bitstream advantageously provides for robust synchronization in the presence of bitstream corruption while maintaining multimedia decoder modularity.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
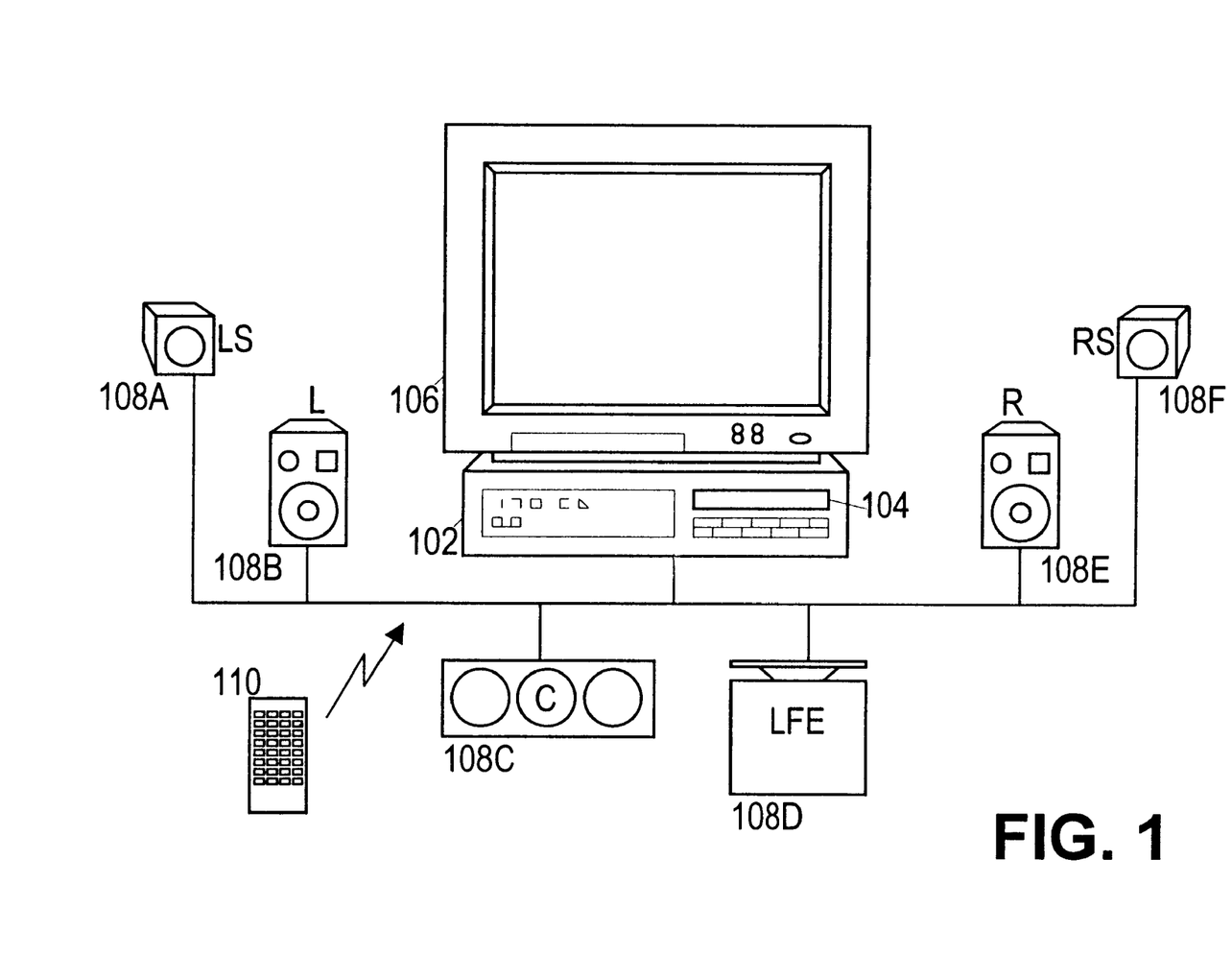
FIG. 1 shows a multimedia system which includes a multi-channel audio subsystem.

Turning now to the figures, FIG. 1 shows a video playback device 102 which includes a multimedia disc drive 104, is coupled to a display monitor 106 and a set of speakers 108, and which may be controlled via a remote control 110. Video playback device 102 includes a multimedia decoder which advantageously maintains elementary audio bitstream synchronization by insertion of a synchronization word in decoded LPCM elementary bitstreams. The device 102 accepts multimedia discs in drive 104, and can read compressed multimedia bitstreams from the multimedia disc. The device 102 can convert the multimedia bitstreams into audio and video signals and present the video signal on display monitor 106 and the audio signals on speaker set 108.

Examples of display monitors 106 include: televisions, computer monitors, LCD/LED flat panel displays, and projection systems. The speaker set 108 may exist in various configurations. A single center speaker 108C may be provided. Alternatively, a pair of left and right speakers 108B, 108E may be provided and used alone or in conjunction with a center speaker 108C. Four speakers, 108B, 108C, 108E, 108F may be provided in a left, center, right, surround configuration, or five speakers 108A, 108B, 108C, 108E, 108F may be provided in a left surround, left, center, right, right surround configuration. Additionally, a low-frequency speaker 108D may be provided in conjunction with any of the above configurations.

In one embodiment, multimedia drive 104 is configured to accept a variety of optically readable disks. For example, audio compact disks, CD-ROMs, DVD disks, and DVD-RAM disks may be accepted. The drive 104 can consequently read audio programs and multimedia bitstreams. The drive 104 may also be configured to write multimedia bitstreams, and may additionally be configured to write audio programs. The drive 104 includes a multimedia decoder which converts read multimedia bitstreams into video displays and audio programs. The drive 104 may also include a multimedia encoder for converting video displays and audio programs into a multimedia bitstream. A user can instruct the device 102 to forward any received video displays and audio programs directly to the display monitor 106 and speaker set 108 for display and audio playback.

Figure 2:
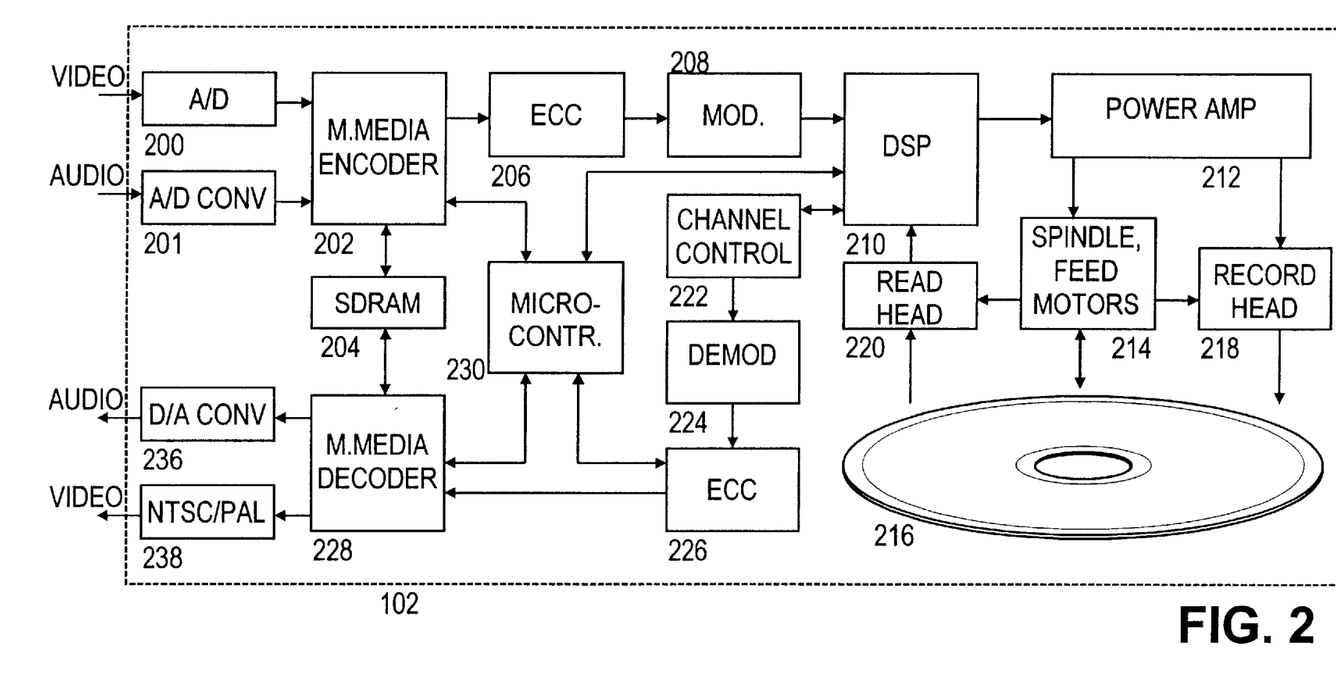
FIG. 2 shows a functional block diagram of a multimedia recording and playback device.

Turning now to FIG. 2, a functional block diagram of one embodiment of a video playback device 102 is shown. The device 102 provides audio and video signals to the display monitor 106, and can accept audio and video signals from a television tuner or some other source. The received video and audio signals are converted to digital video and audio signals by A/D converters 200, 201. The digital audio and video bitstreams are provided to multimedia encoder 202. Multimedia encoder 202 uses synchronous dynamic random access memory (SDRAM) 204 as a frame store buffer while encoding the received signals. The resulting multimedia bitstream is processed by an error correction encoder 206 then converted to a modulated digital signal by modulator 208. The modulated digital signal is coupled to a digital signal processor (DSP) 210 and from there to a power amplifier 212. Amplified signals are coupled to drive motors 214 to spin a recordable multimedia disk 216, and to a record head 218 to store the modulated digital signal on the recordable multimedia disk 216.

Stored data can be read from the recordable multimedia disk 216 by read head 220 which sends a read signal to DSP 210 for filtering. The filtered signal is coupled to channel control buffer 222 for rate control, then demodulated by demodulator 224. An error correction code decoder 226 converts the demodulated signal into a multimedia bitstream which is then decoded by multimedia decoder 228. In decoding the multimedia bitstream, the multimedia decoder 228 produces digital audio and video bitstreams which are provided to D/A converters 236 and 238, which in turn provide the audio and video signals to display monitor 106. Video D/A 238 is typically an NTSC/PAL rasterizer for television, but may also be a RAMDAC for other types of video screens.

Multimedia encoder 202 operates to provide compression of the digital audio and video signals. The digital signals are compressed individually to form bitstreams which are then divided into packets which are inter-mixed to form the compressed multimedia bitstream. Various compression schemes may be used, including MPEG and DVD.

In one embodiment, the general nature of the video compression performed by multimedia encoder 202 is MPEG encoding. The video compression may include sub-sampling of the luminance and chrominance signals, conversion to a different resolution, determination of frame compression types, compression of the frames, and re-ordering of the frame sequence. The frame compression may be intraframe compression or interframe compression. The intraframe compression is performed using a block discrete cosine transform with zigzag reordering of transform coefficients followed by run length and Huffman encoding of the transform coefficients. The interframe compression is performed by additionally using motion estimation, predictive coding, and coefficient quantization.

In one embodiment, the general nature of the audio compression performed by multimedia encoder 202 is MPEG-2/AC-3 encoding. The audio compression may include locking the input sampling rate to the output bit rate, sample rate conversion, input filtering, transient detection, windowing, time-to-frequency domain transformation, channel coupling, rematrixing, exponent extraction, dithering, encoding of exponents, mantissa normalization, bit allocation, quantization of mantissas, and packing of audio frames, e.g. for AC-3 encoding. Similarly, the audio compression may include filter bank synthesis, calculation of signal to noise ratio, bit or noise allocation for audio samples, scale factor calculation, sample quantization, and formatting of the output bitstream, e.g. for MPEG-2 encoding. For either method, the audio compression may further include subsampling of low frequency signals, adaptation of frequency selectivity, and error correction coding.

Figure 3A:
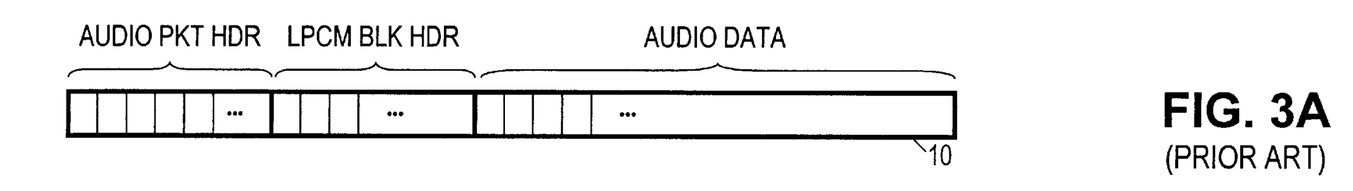
FIG. 3 shows examples of an LPCM formatted data packet.
Figure 3B:
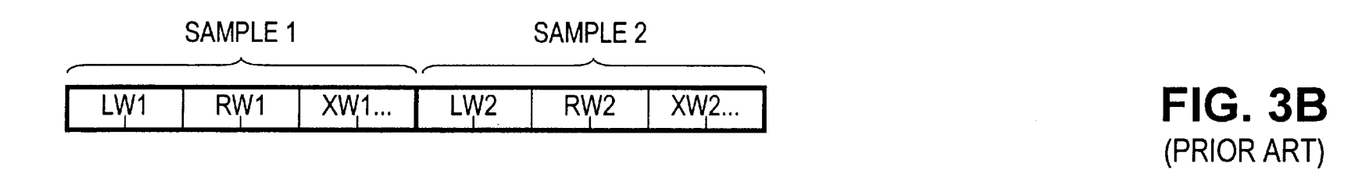
Figure 3C:
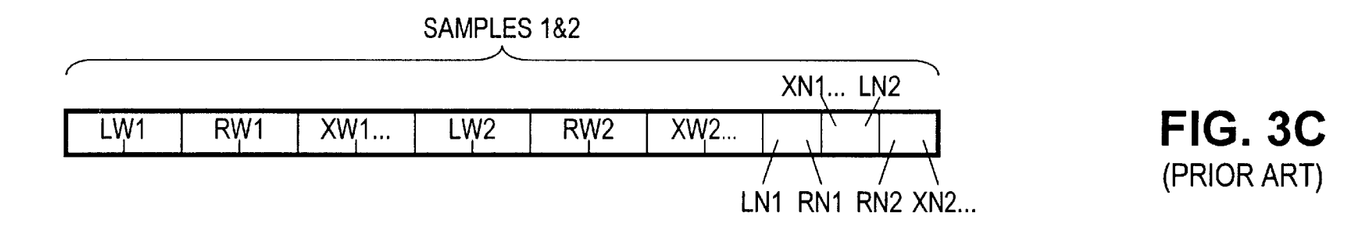
Figure 3D:
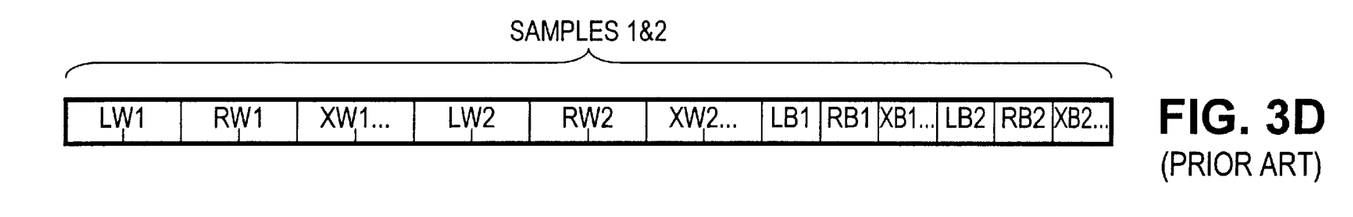

In another embodiment, audio compression may not be employed, and the audio channels may be formatted as a linear pulse-code modulation (LPCM) bitstream. In this form, the audio samples are taken in their raw form, i.e. as a sampled signal amplitude, and byte-packed into audio substream packets. Turning momentarily to FIG. 3, examples of LPCM formatted audio data packets are shown. FIG. 3A shows an audio data packet 10 comprising an audio packet header, an LPCM block header, and an audio data payload. The format of the audio data in the payload is dependent on the bit-width of the samples. FIG. 3B shows how the audio samples in the audio data payload may be stored for 16-bit samples. In this example, the 16-bit samples made in a given time instant are stored as left (LW) and right RW), followed by samples for any other channels (XW). Allowances are made for up to 8 channels. FIG. 3C shows how the audio samples in the audio data payload are stored for 20-bit samples. In this example, byte-alignment is preserved by grouping sample times into pairs. The most significant 16 bits for samples in the paired time instants are stored in the same manner as before. The remaining nibbles are grouped together following the 16-bit words. The nibbles are packed in the same order as the previous portions of the samples, i.e. LN1,RN1,XN1,LN2,RN2,XN2. FIG. 3D shows how the audio samples in the audio data payload are stored for 24-bit samples. In this example, the portions of the audio samples are ordered in the same manner as FIG. 3C. The primary difference is that the remaining portions (4-bit nibbles in the previous example) are now 8-bit bytes.

Returning to FIG. 2, error correction encoder 206 and modulator 208 operate to provide channel coding and modulation for the output of the multimedia encoder 202. Error correction encoder 206 may be a Reed-Solomon block code encoder, which provides protection against errors in the read signal. The modulator 208 converts the error correction coded output into a modulated signal suitable for recording on multimedia disk 216.

DSP 210 serves multiple functions. It provides filtering operations for write and read signals, and it acts as a controller for the read/write components of the system. The modulated signal provided by modulator 208 provides an "ideal" which the read signal should approximate. In order to most closely approximate this ideal, certain nonlinear characteristics of the recording process must often be compensated. The DSP 210 may accomplish this compensation by pre-processing the modulated signal and/or post-processing the read signal. The DSP 210 controls the drive motors 214 and the record head 218 via the power amplifier 212 to record the modulated signal on the multimedia disk 216. The DSP 210 also controls the drive motors 214 and uses the read head 220 to scan the multimedia disk 216 and produce a read signal.

The channel control buffer 222 provides buffering of the read signal, while demodulator 224 demodulates the read signal and error correction code decoder 226 decodes the demodulated signal. After decoding the demodulated signal, the error correction decoder 226 forwards the decoded signal to multimedia decoder 228.

Multimedia decoder 228 operates to decode the output of the error correction decoder 226 to produce digital audio signals and video signals. The operation and structure of multimedia decoder 228 are discussed further below. The digital audio signal and video signals may be converted to analog audio and video signals before being sent to display monitor 106.

Figure 4:
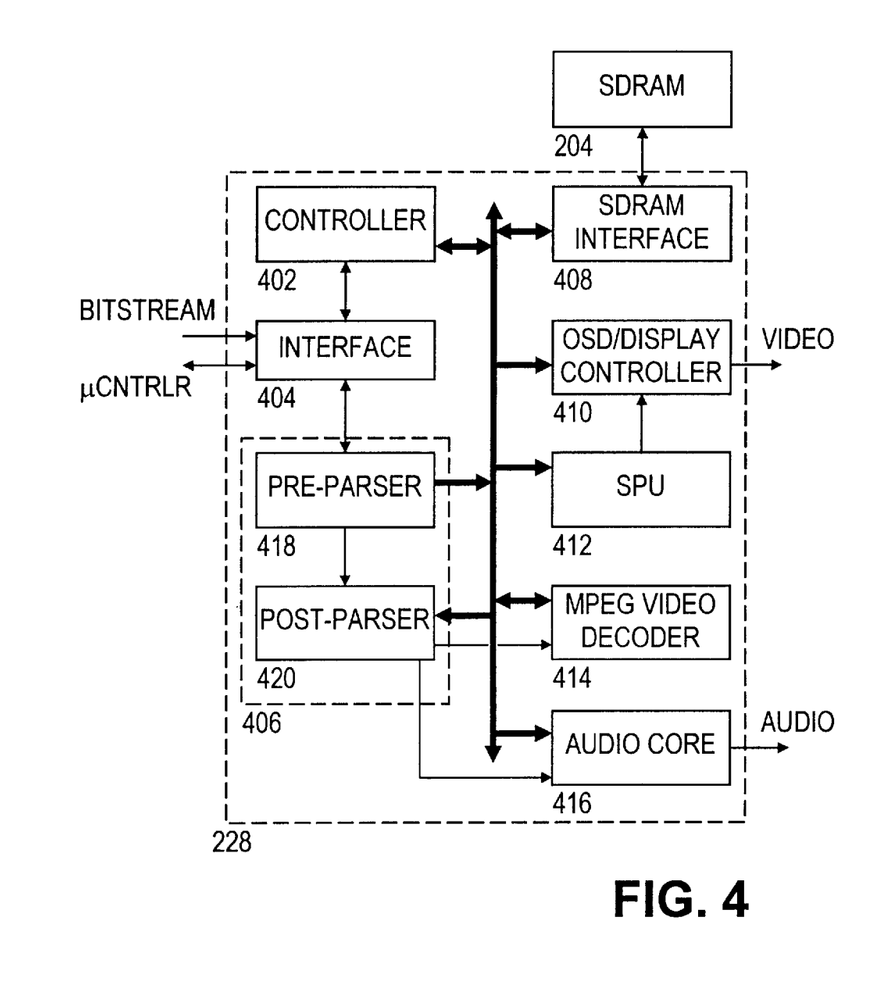
FIG. 4 shows a block diagram of a multimedia bitstream decoder.

Turning now to FIG. 4, a block diagram of one embodiment of multimedia decoder 228 is shown. Multimedia decoder 228 comprises a controller 402, a host interface 404, a variable length decoder (VLD) 406, a memory interface 408, a display controller 410, a sub-picture unit (SPU) 412, an MPEG video decoder 414, and an audio core 416. VLD 406 includes a pre-parser 418 and a post-parser 420. Controller 402 is coupled to the rest of the modules of multimedia decoder 228 to configure their behavior by setting various configuration registers and to monitor their performance. Controller 402 may also transmit status and request information to an external microcontroller 230. Host interface 404 is coupled to controller 402 and VLD 406, and is configured to receive an encoded multimedia bitstream and to communicate with an external microcontroller 230. Various operating instructions (e.g. reset, begin decode, playback mode) may be provided by external microcontroller 230 to controller 402 via host interface 404. Other operating instructions may be found in the encoded multimedia bitstream and provided to controller 402 (e.g. navigation commands).

VLD decoder 406 receives the encoded multimedia bitstream from host interface 404 and parses the encoded multimedia bitstream. Pre-parser 418 determines the substream membership of each data packet from the packet header and routes the packet contents (minus identifying fields from the packet header) to the appropriate elementary bitstream buffer in memory 204, where they wait on the availability of the associated module to begin being processed. Uncompressed data packets are retrieved directly from the appropriate buffer in memory 204 by the associated module. However, many of these data packets have variable-length encoded data (e.g. compressed audio and video). These data packets are passed to the associated module via post-parser 420. Post-parser 420 parses the bitstream syntax and performs elementary operations such as extracting the bit allocation and scaling information from the headers, and applying that information to convert the variable-length encoded data into fixed-length transform coefficients for subsequent modules to process.

Memory interface 408 acts as a bus arbiter and provides access to memory 204 for the other modules. Display controller 410 retrieves decoded digital video data from a buffer in memory 204 and provides it in raster order as a digital video output. Display controller 410 may incorporate an on-screen display (OSD) unit that can overlay system information on the video image, e.g. configuration menus, time, channel, volume, etc. Display controller 410 may also be coupled to overlay bitmap signals from other modules onto the video image. SPU controller 412 retrieves bitstream information from an SPU buffer in memory 204, decodes it into bitmap information, and provides the resulting bitmap to display controller 410 for possible display.

Video decoder 414 receives variable length decoded transform coefficients from post-parser 420 and decodes them to generate decoded video data. The decoding process typically involves reference to anchor frames stored in frame buffers in memory 204. Video decoder 414 retrieves anchor frame data from the frame buffers and writes the decoded video data to anchor frame buffers or to intermediate buffers from which it is retrieved by display controller 410 for display.

Audio decoder 416 receives variable length decoded transform coefficients or byte-packed LPCM audio data from post-parser 420. Audio decoder 416 is configurable to convert transform coefficients into digital audio samples, and is also configurable to re-assemble LPCM audio data into digital audio samples.

Due to occasional corruption of data packets in the bitstream, it is sometimes necessary to discard a partial or entire audio or video data packet, attempt to mask the resulting discontinuity, and start decoding again with the next audio or video packet. Among the possible effects of the corruption is a change in the size of the data packet relative and/or a change in the value of the packet-size field. As a consequence, a search is commonly performed by audio decoder 416 to identify the beginning of the next data packet.

It is noted that conventional LPCM elementary bitstreams are not provided with a synchronization word, i.e. once the identifying fields are removed, there are no defined constant bytes which could serve to identify the beginning of an audio data packet. Conversely, with MPEG and AC-3 encoded audio bitstreams, each audio data packet begins with a 2-byte synchronization word which has a minimal probability of appearing elsewhere in the elementary bitstream. Preferably, the audio decoder 416 does not begin decoding until the synchronization words have been identified at the beginning of three consecutive audio data packets.

This approach is unworkable for LPCM elementary bitstreams. LPCM bitstreams may have a sampling rate twice that of MPEG or AC-3 encoded audio bitstreams, and may be provided with 24 bit resolution, which is 50% larger than the 16-bit resolution of MPEG and AC-3 audio bitstreams. To detect synchronization words for 3 consecutive LPCM data packets requires an undesirably large amount of high-bandwidth memory due to the large amount of data which must be stored and searched quickly. Further, since the LPCM data is uncompressed, all two-byte synchronization words have a unacceptably high probability of occurrence in the elementary bitstream that inordinately increases the likelihood of false synchronization detection.

In one embodiment, improved resistance to false synchronization is provided by insertion of a synchronization word with a length of eight bytes. As pre-parser 418 removes the identifying fields, it inserts a synchronization word. The pre-parser 418 may then adjust the packet-size field value to reflect the now-reduced packet size. The audio decoder 416 can then use the inserted synchronization word to locate and verify the beginning of each LPCM audio data packet. Although the new synchronization word can still legally occur elsewhere in the elementary bitstream, the probability of a chance occurrence is greatly reduced relative to a two-bye synchronization word. The multimedia decoder 228 advantageously exhibits robust re-synchronization after corrupted audio data packets while maintaining minimal memory requirements for buffering the LPCM elementary bitstream.

Figure 5:
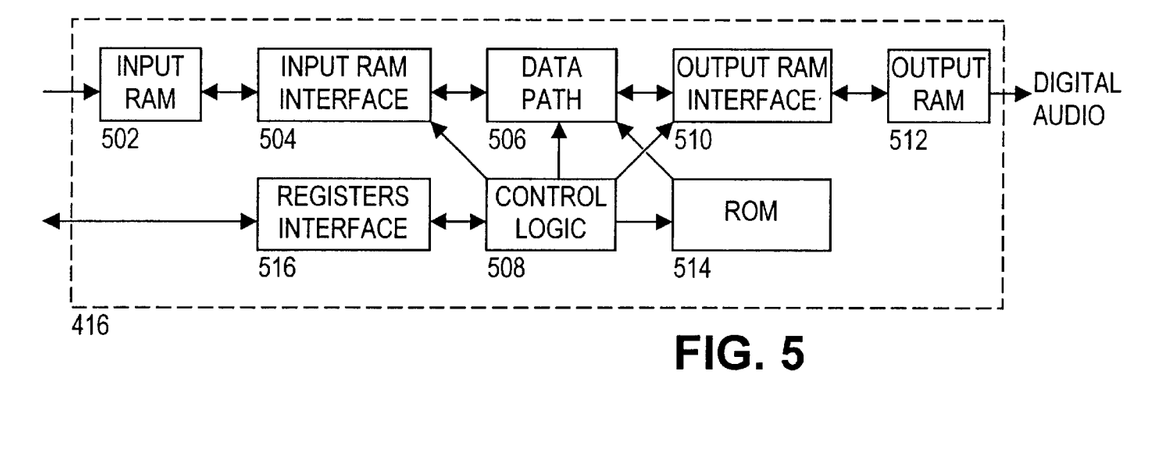
FIG. 5 shows a block diagram of an audio decoder.

FIG. 5 shows one embodiment of audio decoder 416 comprising an input memory 502, an input memory interface 504, a data path 506, control logic 508, an output memory interface 510, output memory 512, and a coefficient memory 514. Audio decoder 416 can operate several modes. Depending on the elementary bitstream format, data is retrieved by input memory 502 from the audio elementary bitstream buffer via post-parser 420.

For MPEG and AC-3 audio data, the data initially held in input memory 502 is a set of transform coefficients. The transform coefficients are retrieved from input memory 502 via input memory interface 504 by data path 506 under the control of control logic 508. The transform coefficients are provided in blocks, each block representing the audio samples of one audio channel in one audio frame. Under control of control logic 508, the data path 506 operates on the transform coefficients to transform, window, and downmix data to produce the desired audio output. Intermediate results may be written to input memory 502 via input memory interface 504 and to output memory 512 via output memory interface 510. The final results are written to output memory 512. Control logic 508 operates according to control registers in control logic 508. Control logic 508 uses coefficients stored in coefficient memory 514 to perform the inverse transformation, and subsequently changes mode to perform the windowing and downmix operations. Mode control bits and downmix coefficients are provided to control registers in control logic 508 by CPU 302 via registers interface 516.

Under control of control logic 508, data path 506 performs inverse transform operations and writes the resulting audio samples back to a buffer in the input memory 502. After the inverse transform is complete, the audio samples are again retrieved. At this point, the first half of the audio samples may be combined (windowed) with delayed audio samples and written to a corresponding channel buffer in output memory 512 via output memory interface 510, and the second half of the audio samples may be stored as delay samples in a corresponding channel buffer in input memory 502. The inverse transform and windowing is repeated for each of the audio channels in the audio frame. Downmixing may then be performed. To perform the downmixing, audio samples from each channel buffer in the output memory 512 are retrieved, combined according to a matrix of downmix coefficients, and written back to output memory 512.

For LPCM audio data, the necessary decoding operations include searching for a synchronization word, calculating scale values, combining bytes and nibbles with words to reconstruct full-resolution data samples, and scaling the data samples to generate the digital audio samples. Downmixing may be optionally performed. To provide audio decoder 416 with each mode and operation, control logic implements a corresponding state-transition diagram. At each state, the control logic 508 provides a set of control signals to input memory interface 504, data path 506, output memory interface 510, and coefficient memory 514 to govern their operations.

Figure 6:
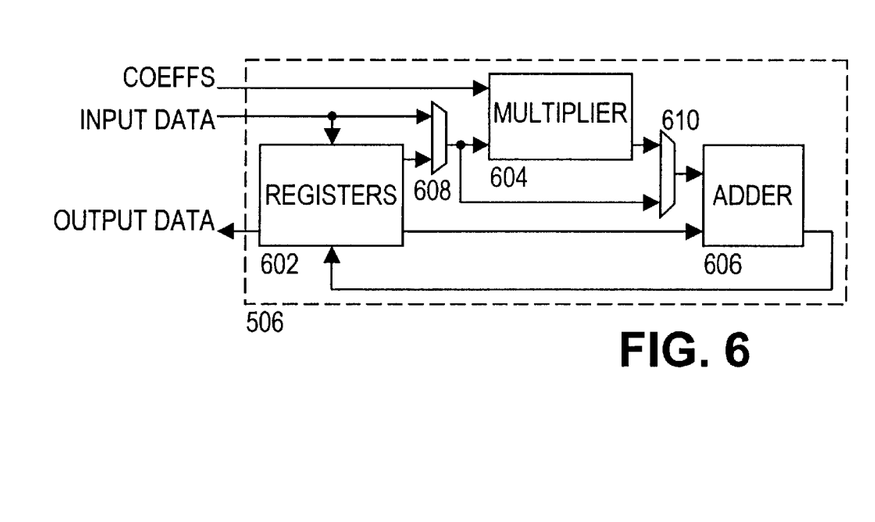
FIG. 6 shows a block diagram of a data path usable in an audio decoder.

FIG. 6 shows a functional block diagram of one embodiment of data path 506, which comprises registers 602, multiplier 604, adder 606, and multiplexers 608 and 610. Each of these components is provided with one or more control signals to latch inputs, to initiate operations, or to route signals. The control logic 508 implements a state machine for each of the transformation, windowing, downmixing, and reconstruction operations, and provides the control signals to the data path 506 in accordance with the state machines. Control logic 510 also controls interfaces 504 and 510 to route input data and output data to and from data path 506, and accesses coefficient memory 514 to provide multiplier coefficients to data path 506. Depending on the control signals, data path 506 scales, adds, and/or accumulates input values to produce output values. Registers 602 is a collection of registers for latching and storing input, output, and intermediate values. Input data is routed to registers 602 or multiplexer 608. Multiplexer 608 forwards either the input data value or a stored register value to multiplier 604. When triggered, multiplier 604 multiplies the forwarded value with a coefficient from control logic 508. A second multiplexer 610 forwards either the product or the forwarded value from the first multiplexer 608. When triggered, adder 606 adds a stored register value to the forwarded value from the second multiplexer 610, and stores the result in one of the registers 602. One of the registers in register 602 is an output register which latches in accordance with a control signal from control logic 508.

Data path 506 is a very flexible module capable of implementing a wide variety of algorithms. The algorithms and the order in which they are implemented is determined by control logic 508. A state diagram may be used to describe each algorithm which the control logic 508 implements, and a master state diagram may be used to provide selection and ordering of the individual algorithms.

Figure 7:
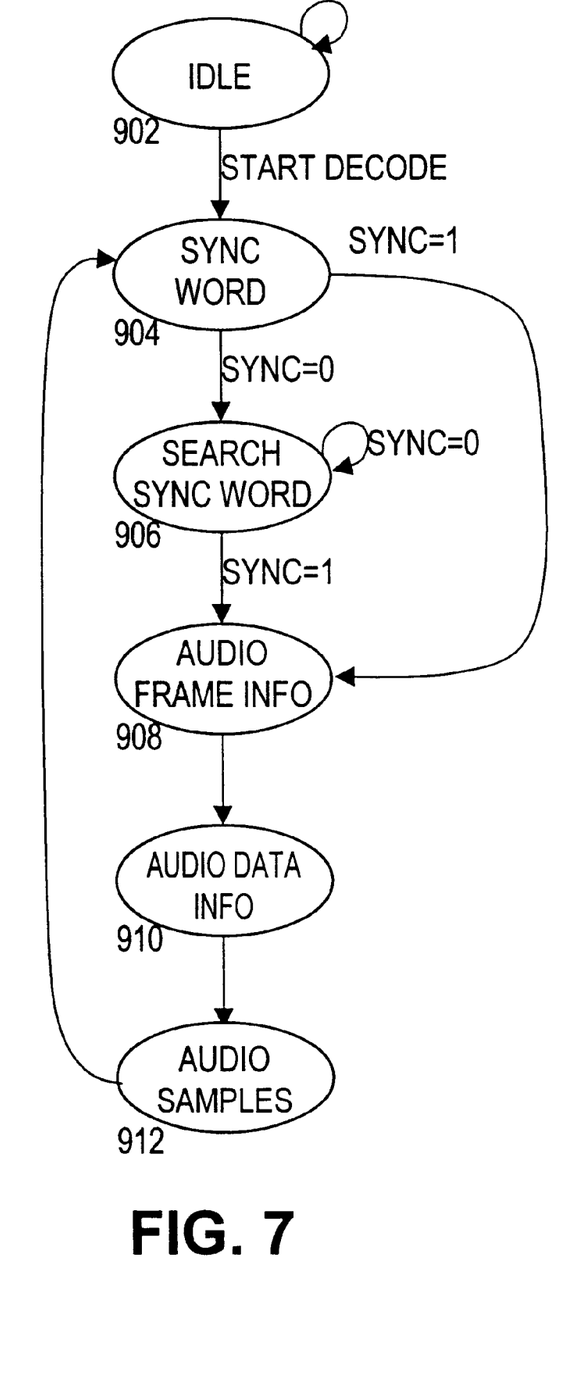
FIG. 7 shows a state diagram implemented by a control module to maintain LPCM synchronization.

FIG. 7 shows a high level state-transition diagram which may be implemented by control logic 508 during retrieval and decoding of LPCM audio data. It includes idle state 902, sync word detect state 904, sync word search state 906, audio frame information retrieval state 908, audio data information retrieval state 910, and audio sample reconstruction state 912. When multimedia decoder 228 begins receiving a program bitstream with LPCM audio data, a start decode signal is asserted, and control logic 508 moves to sync word detect state 904. If the next eight bytes equal the inserted synchronization word, a SYNC signal is asserted and control logic 508 enters state 908. Otherwise, the SYNC signal is de-asserted, and control logic 508 enters sync word search state 906. In state 906, control logic 508 conducts a byte-by-byte search for the inserted synchronization word until one is found, at which point the SYNC signal is asserted, and control logic enters state 908. In state 908, control logic 508 retrieves frame information from header fields such as the emphasis flag, mute flag, and frame number. Then, in state 910, control logic 508 retrieves audio data information from header fields such as quantization word length, sampling frequency, number of audio channels, and scale factor (range control). Next, in state 912, the control logic 518 begins reconstruction of the audio samples using the retrieved audio data information. After all the audio samples have been reconstructed, or when an error occurs, control logic returns to sync word detect state 904.

It is noted that various synchronization words may be used for LPCM synchronization. Acceptable synchronization word lengths may vary from four bytes to ten bytes, but preferably six to eight bytes are used. Byte patterns with a lower probability of occurrence are preferred, e.g. eight identical bytes would NOT be a desirable synchronization word since time correlation and channel correlation of samples conspire to make this event not improbable enough. In one embodiment, the synchronization word comprises four 16-bit words (eight bytes total) alternating between near-maximum (7F7F) and zero-amplitude (0000) values. In another embodiment, the synchronization word comprises eight bytes {4C,53,49,4C,4F, 47,49,43} representing the letters L,S,I,L,O,G,I,C in ASCII.

Figure 8:
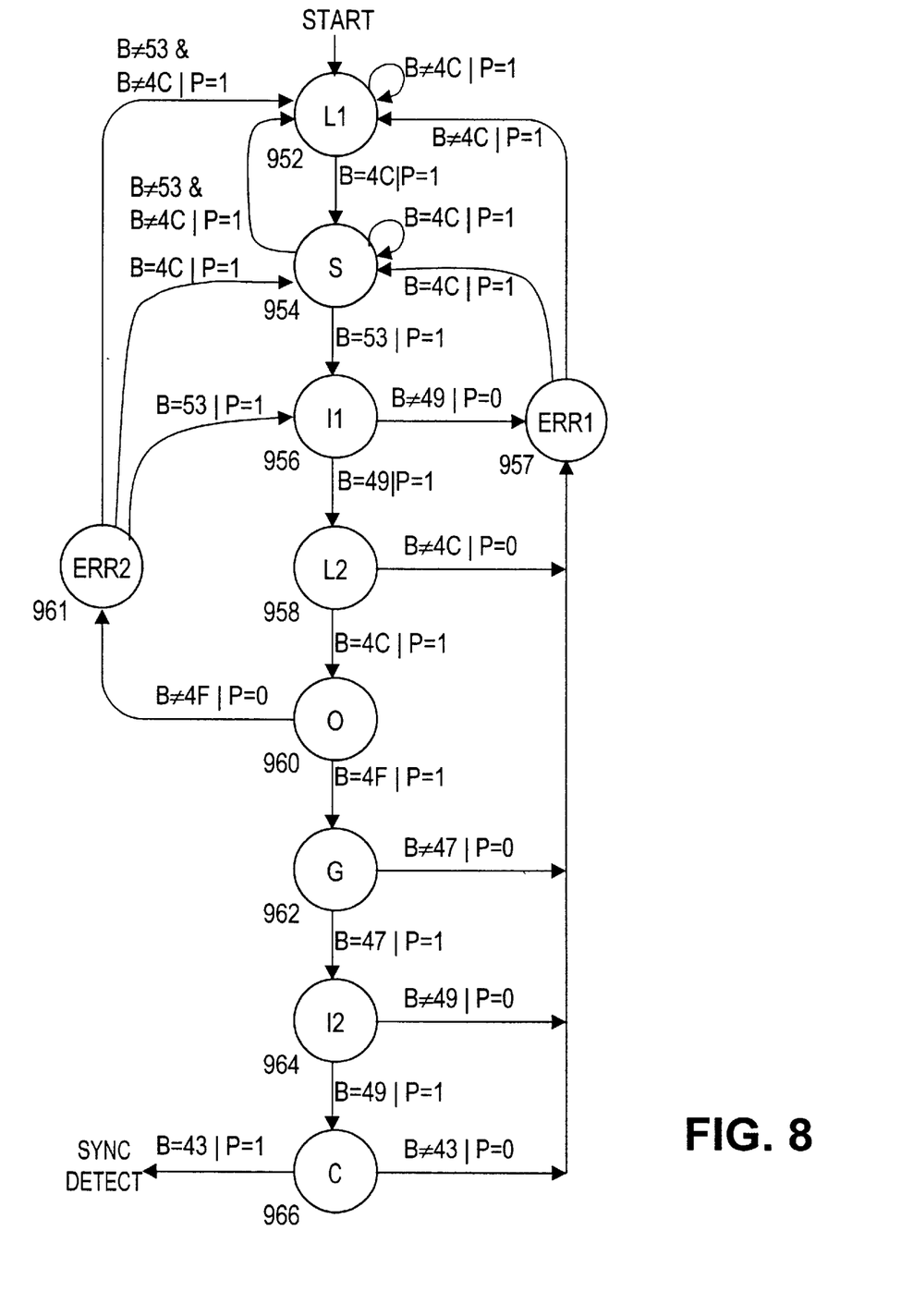
FIG. 8 shows a state diagram for detecting a synchronization word.

FIG. 8 shows a state transition diagram that control logic 508 may implement to detect and/or search for the synchronization word LSILOGIC. It includes L1 state 952, S state 954, I1 state 956, ERR1 state 957, L2 state 958, O state 960, ERR2 state 961, G state 962, I2 state 964, and C state 966. Control logic 508 enters at state 952. In state 952, control logic 508 tests for equality between a byte B and the value 4C. If equality is not found, control logic 508 asserts pop signal P to retrieve the next byte B, and re-enters state 952. Otherwise, control logic asserts pop signal P to retrieve the next byte B and enters state 954. In state 954 control logic 508 tests for equality with 53 and 4C. If B=53, then control logic asserts pop signal P to retrieve the next byte B and enters state 956. If B=4C, then the control logic asserts pop signal P to retrieve the next byte B and re-enters state 954. Otherwise, the control logic 508 asserts pop signal P and returns to state 952.

In state 956, control logic 508 tests for equality with 49. If equality is found, control logic asserts the pop signal P and enters state 958. Otherwise, control logic 508 de-asserts pop signal P to retain the current byte B and enters state 957. In state 957, control logic 508 tests for equality with 4C. If equality is found, then control logic 508 asserts pop signal P and enters state 954. Otherwise control logic 508 asserts pop signal P and enters state 952.

In state 958, control logic tests for equality between byte B and 4C. If equality exists, then control logic 508 asserts pop signal P and enters state 960. Otherwise, control logic 508 de-asserts pop signal P and enters state 957. In state 960, control logic 508 tests for equality with 4F. If byte B=4F, then control logic asserts pop signal P and enters state 962. Otherwise, control logic 508 de-asserts pop signal P and enters state 961. In state 961, control logic 508 tests for equality with 4C and 53. If B=53, control logic asserts pop signal P and enters state 956. If B=4C, control logic 508 asserts pop signal P and enters state 954. Otherwise, control logic 508 asserts pop signal P and enters state 952.

In state 962, control logic 508 tests for equality between B and 47. If B=47, control logic 508 assets pop signal P to retrieve the next byte B and enters state 964. Otherwise, control logic 508 de-asserts pop signal P to retain the current byte B and enters state 957. In state 964, control logic 508 tests for equality with 49. If B=49, control logic 508 asserts pop signal P and enters state 966. Otherwise, control logic 508 de-asserts pop signal P and enters state 957. In state 966, control logic tests for equality with 43. If B=43, control logic 508 asserts pop signal P and asserts the SYNC signal, and enters into state 908 (FIG. 7). Otherwise control logic 508 de-asserts pop signal P and returns to state 957.

Numerous variations and modifications will become apparent to those skilled in the art once the above disclosure is fully appreciated. It is intended that the following claims be interpreted to embrace all such variations and modifications.

What is claimed is:

1. A multimedia decoder which comprises:
   a pre-parser configured to receive a multimedia bitstream and to separate the multimedia bitstream into an audio substream and a video substream, wherein the pre-parser is further configured to remove substream identification fields from the audio substream and to insert a synchronization word before each data packet of the audio substream to form an elementary audio bitstream;
   a memory coupled to the pre-parser to buffer the elementary audio bitstream; and
   an audio decoder coupled to the memory to retrieve the elementary audio bitstream and configured to convert the elementary audio bitstream into a digital audio signal,
   wherein the audio substream is in a linear pulse-code modulation (LPCM) format, and wherein the inserted synchronization word comprises at least four bytes and no more than 10 bytes in length.

2. The multimedia decoder of claim 1, further comprising:
   a post-parser coupled to the pre-parser to receive the video substream and configured to convert the video substream into a stream of decompressed transform coefficients; and
   a video decoder coupled to receive the stream of decompressed transform coefficients from the post-parser and configured to convert the stream of decompressed transform coefficients into a digital video signal.

3. The multimedia decoder of claim 2, wherein the inserted synchronization word comprises at least six bytes and no more than eight bytes.

4. The multimedia decoder of claim 3, wherein the synchronization word comprises an alternating sequence of 7F7F and 0000 16-bit word values.

5. The multimedia decoder of claim 4, wherein the synchronization word comprises eight bytes in length.

6. The multimedia decoder of claim 5, wherein the synchronization word comprises (in hex) 4C,53,49,4C,4F, 47,49,43.

7. The multimedia decoder of claim 1, wherein the synchronization word comprises ASCII values for L,S,I,L, O,G,I,C.

8. The multimedia decoder of claim 1, wherein the audio decoder comprises:
   an input interface configured to retrieve bytes of the elementary audio bitstream in response to a pop signal;
   a data path coupled to the input interface and configured to operate on retrieved bytes in accordance with control signals and test values; and
   a control module coupled to provide the pop signal to the input interface and the control signals to the data path, wherein the control module is configured to have the data path conduct a search for the inserted synchronization word.

9. A multimedia playback system which comprises:
   a pre-parser configured to receive a multimedia bitstream and to separate the multimedia bitstream into an audio substream and a video substream, wherein the pre-parser is further configured to remove substream identification fields from the audio substream and to insert a synchronization word before each data packet of the audio substream;
   a post-parser coupled to the pre-parser to receive the video substream and configured to convert the video substream into a stream of decompressed transform coefficients; and
   a video decoder coupled to receive the stream of decompressed transform coefficients from the post-parser and configured to convert the stream of decompressed transform coefficients into a digital video signal,
   wherein the audio substream is in a linear pulse-code modulation (LPCM) format, and wherein the inserted synchronization word comprises at least four bytes and no more than 10 bytes in length.

10. The multimedia playback system of claim 9, wherein the synchronization word comprises an alternating sequence of 7F7F and 0000 (hexadecimal) word values.

11. The multimedia playback system of claim 10, wherein the synchronization word comprises eight bytes in length.

12. The multimedia playback of claim 9, wherein the synchronization word comprises ASCII values for L,S,I,L, O,G,I,C.

13. An audio playback system which comprises:
   an input interface configured to retrieve bytes of an audio bitstream in response to a pop signal;
   a data path coupled to the input interface and configured to operate on retrieved bytes in accordance with control signals and test values; and
   a control module coupled to provide the pop signal to the input interface and the control signals to the data path, wherein the control module is configured to have the data path conduct a search for an inserted synchronization word,
      wherein the audio bitstream is in a linear pulse-code modulation (LPCM) format, and wherein the inserted synchronization word comprises at least four bytes and no more than 10 bytes in length.

14. The audio playback system of claim 13, wherein the synchronization word comprises an alternating sequence of 7F7F and 0000 (hexadecimal) word values.

15. The audio playback system of claim 13, wherein the synchronization word comprises ASCII values for L,S,I,L, O,G,I,C.

16. The audio playback system of claim 13, further comprising an output interface coupled to the data path to receive an output digital audio signal, wherein the data path is further configured to operate on retrieved bytes in accordance with control signals to convert the retrieved bytes into the output digital audio signal.

* * * * *